United States Patent
Benoit et al.

(10) Patent No.: US 9,763,086 B2
(45) Date of Patent: Sep. 12, 2017

(54) OWNER ACCESS POINT TO CONTROL THE UNLOCKING OF AN ENTRY

(71) Applicant: QUALCOMM Incorporated, San Diego, CA (US)

(72) Inventors: Olivier Jean Benoit, San Diego, CA (US); Fabrice Jean Hoerner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/011,257

(22) Filed: Aug. 27, 2013

(65) Prior Publication Data
US 2015/0067792 A1    Mar. 5, 2015

(51) Int. Cl.
*H04W 12/04*   (2009.01)
*H04W 12/06*   (2009.01)
*G07C 9/00*    (2006.01)
*H04L 29/06*   (2006.01)
*H04W 84/12*   (2009.01)

(52) U.S. Cl.
CPC ........ *H04W 12/04* (2013.01); *G07C 9/00857* (2013.01); *H04W 12/06* (2013.01); *G07C 9/00904* (2013.01); *G07C 2209/08* (2013.01); *H04L 63/108* (2013.01); *H04W 84/12* (2013.01)

(58) Field of Classification Search
None
See application file for complete search history.

(56) References Cited

U.S. PATENT DOCUMENTS

| 8,331,544 | B2 | 12/2012 | Kraus et al. |
| 8,482,378 | B2 | 7/2013 | Sadighi et al. |
| 2002/0031228 | A1 | 3/2002 | Karkas et al. |
| 2005/0071645 | A1* | 3/2005 | Girouard ................. G06F 21/31 713/183 |
| 2005/0124288 | A1* | 6/2005 | Karmi ................. H04L 12/5692 455/3.01 |

(Continued)

FOREIGN PATENT DOCUMENTS

| CN | 1883156 A | 12/2006 |
| CN | 103269326 A | 8/2013 |

(Continued)

OTHER PUBLICATIONS

International Search Report and Written Opinion—PCT/US2014/049988—ISA/EPO—dated Nov. 4, 2014.

*Primary Examiner* — Dede Zecher
*Assistant Examiner* — Richard A McCoy
(74) *Attorney, Agent, or Firm* — Blakely, Sokoloff, Taylor & Zafman

(57) ABSTRACT

Disclosed is a method, apparatus, and system to control the unlocking of an entry for a guest having a wireless device by an owner access point. A virtual key for a wireless device and an access control rule associated with the virtual key may be stored at the owner access point. The owner access point may determine whether a virtual key received from a wireless device matches the stored virtual key and whether the access control rule for the stored virtual key is satisfied. If the virtual key matches, and the access control rule for the stored virtual key is satisfied, the owner access point may transmit an open command to the entry.

33 Claims, 4 Drawing Sheets

(56) References Cited

U.S. PATENT DOCUMENTS

| | | | |
|---|---|---|---|
| 2006/0288231 A1* | 12/2006 | Kim | H04L 63/083 713/184 |
| 2007/0028299 A1* | 2/2007 | Albano | G06F 21/46 726/5 |
| 2007/0179682 A1* | 8/2007 | Hu | B60R 25/1003 701/1 |
| 2007/0200665 A1 | 8/2007 | Studerus | |
| 2008/0074234 A1* | 3/2008 | Nelson | B60R 25/04 340/5.2 |
| 2009/0141117 A1* | 6/2009 | Elberbaum | H04N 7/186 348/14.04 |
| 2010/0174758 A1* | 7/2010 | Radenkovic | G06F 21/41 707/803 |
| 2011/0321105 A1* | 12/2011 | Ogle | H04N 21/2143 725/98 |
| 2012/0218076 A1* | 8/2012 | Zacchio | E05B 47/02 340/5.61 |
| 2012/0222103 A1* | 8/2012 | Bliding | G07C 9/00103 726/7 |
| 2013/0059603 A1* | 3/2013 | Guenec | G06Q 10/02 455/456.2 |
| 2013/0176107 A1 | 7/2013 | Dumas et al. | |
| 2014/0035721 A1* | 2/2014 | Heppe | G07C 9/00912 340/5.54 |
| 2014/0176308 A1* | 6/2014 | Lee | H04L 12/282 340/12.5 |
| 2015/0052253 A1* | 2/2015 | Johnson | H04L 61/1511 709/226 |
| 2015/0052258 A1* | 2/2015 | Johnson | H04L 67/141 709/228 |
| 2015/0088982 A1* | 3/2015 | Johnson | H04L 67/34 709/203 |
| 2016/0087933 A1* | 3/2016 | Johnson | G06F 17/30861 709/245 |
| 2016/0112262 A1* | 4/2016 | Johnson | G06F 9/547 709/221 |

FOREIGN PATENT DOCUMENTS

| | | |
|---|---|---|
| GB | 2364202 A | 1/2002 |
| WO | 0163425 A1 | 8/2001 |
| WO | 02095689 A1 | 11/2002 |
| WO | 2012/064264 A1 | 5/2012 |

* cited by examiner

OWNER ACCESS POINT TO CONTROL THE UNLOCKING OF AN ENTRY

BACKGROUND

Field

The present invention relates to method, apparatus, and system to modify the state of an owner system (e.g., the unlocking of an entry) when a guest has a wireless device in range of an owner access point and the appropriate digital key and right.

Relevant Background

Existing procedures that allow a guest to open a locked door or entry way require the use of a mechanical key, the entry of a PIN code to a keypad, or the use of near field communication (NFC) keys. Each of these present procedures include various detrimental issues.

For example, a mechanical key that is to be used by a guest can be used at anytime, can be lost or copied, and needs to be physically given to the guest (e.g., an employee, a housekeeper, a medical assistant, etc.).

As to the use of PIN codes (e.g., for use with a door lock that uses a digital keypad), the key code can be easily forgotten and can be shared with unauthorized persons, both of which are problematic. Further, in order to change the code, the door needs to be physically accessed. Additionally, keeping track of codes for numerous doors is cumbersome.

As to the use of NFC keys (e.g., with door locks using NFC technology), the NFC key typically acts in the form of a physical NFC token and has many of the same problems associated with mechanical keys (e.g., can be lost, copied, etc.). Additionally, an NFC key acting in the form of a digital token typically requires the use of an NFC-enabled smart-phone and requires the user to reach for smart-phone and touch the door in order to open it.

All of these present procedures require a high degree of key management by the owner and involve cumbersome unlocking steps by the guest.

SUMMARY

Aspects of the invention may relate to a method, apparatus, and system to control the unlocking of an entry for a guest having a wireless device by an owner access point. A virtual key for a wireless device and an access control rule associated with the virtual key may be stored at the owner access point. The owner access point may determine whether a virtual key received from a wireless device matches the stored virtual key and whether the access control rule for the stored virtual key is satisfied. If the virtual key matches, and the access control rule for the stored virtual key is satisfied, the owner access point may transmit an open command to the entry.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Embodiments of the invention provide a methodology to control unlocking an entry for a guest having a wireless device by an owner access point (AP). In one embodiment, the owner AP stores a virtual key and an access control rule for the virtual key that are defined for a particular wireless device. The virtual key and the access control rule for the virtual key are issued from an owner device and are transmitted from the owner device to the owner AP. In one embodiment, the owner device may include a virtual key issuer that issues virtual keys for guest wireless devices and associates access control rules for the virtual keys for the guest wireless devices, such that, a guest with a wireless device having the appropriate virtual key, and meeting the predefined access control rules, may be granted access by having an entry opened by the owner AP. The entry (e.g., a door to a building) may be unlocked upon detection and authentication of the guest's wireless device without any user interaction. For example, there is no need for keying a PIN code on a keypad, or utilizing an NFC key and touching the door with an NFC-enabled smart-phone, etc.

Figure 1:
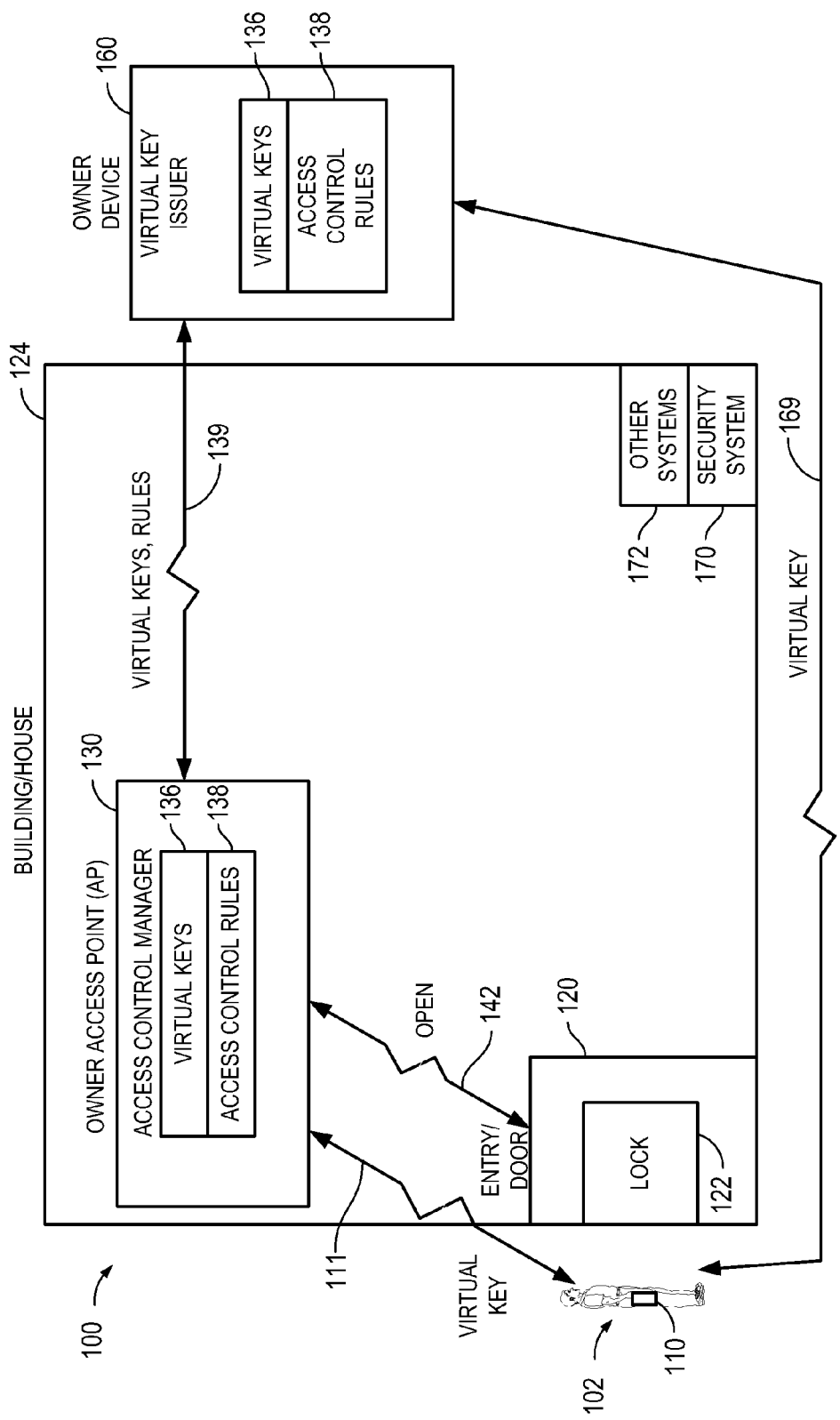
FIG. 1 is a diagram of an example of a system in which embodiments of the invention may be practiced.

With reference to FIG. 1, an example of an environment 100, in which embodiments of the invention may be practiced, is illustrated. As an example, a system and method to control unlocking an entry 120 (e.g., a door) of a building 124 (e.g., a house) for a guest 102 having a wireless device 110 is accomplished by utilizing an owner access point (AP) 130.

In one embodiment, the owner AP 130 stores a virtual key 136 and an access control rule 138 associated with the virtual key for a particular guest wireless device. In particular, the owner AP 130 may have an access control manager application that stores a plurality of virtual keys 136 and associated access control rules 138 for a variety of different guest wireless devices. As will be described, an owner device 160 has a virtual key issuer application that issues virtual keys and associated access control rules for the virtual keys that are stored by the owner AP 130. In particular, the virtual key issuer application of the owner device 160 may define virtual keys and the access control rules associated with the virtual keys for guest wireless devices such that a guest 102 with a wireless device 110 having the appropriate virtual key, and meeting the pre-defined access control rules, may be granted access by having the entry 120 unlocked (e.g., lock 122 is unlocked) by an open command sent via a link 142 from the owner AP 130.

As an example, when a guest 102 with a guest wireless device 110 approaches the entry 120 of the building 124, a virtual key may be transmitted via a wireless link 111 to the owner AP 130, and owner AP 130 under the control of the access control manager application may determine whether the virtual key received from the guest wireless device 110 matches a virtual key 136 stored for the wireless device and matches the access control rule 138 stored for that virtual key, and, if so, owner AP 130 transmits an open command via a link 142, which unlocks lock 122, and allows for the opening of the entry 120 by the guest 102. Also, in one embodiment, a proof of possession of the virtual key may be transmitted by the guest wireless device 110 to the owner AP 130, and the owner AP 130 may determine whether the proof of possession of the virtual key received from the guest wireless device 110 is verified, and, if so, owner AP 130 transmits an open command via link 142, which unlocks lock 122, and allows for the opening of the entry 120 by the guest 102.

With additional reference to FIG. 2, in combination with FIG. 1, example embodiments will be hereinafter described. It should be appreciated that guest wireless device 110 may be any type of wireless device. Guest wireless device 110 may include a processor 112, a memory 114, an interface 116, sensors 117, a display device 118, and an interface 119. Processor 112 may be configured to execute operations to be hereinafter described. In particular, processor 112 may implement a virtual key container application 113 that controls the use and storage of virtual keys 115 that are stored in memory 114. Memory 114 may store these applications, programs, routines, etc., to implement these operations and functions, as well as virtual keys 115.

Guest wireless device 110 may also include common device features such as a display device 118, a user interface 119 (e.g., a keyboard, a keypad, touch screen input, etc.), and a network interface 116. Guest wireless device 110 may include a variety of different types of I/Fs 116 for wireless communication through a wireless network (e.g., WLANs, cellular networks, etc.). As an example, guest wireless device 110 may include a cellular transceiver (e.g., including a transmitter and receiver) that may communicate with a cellular network. Guest wireless device 110 may include a wireless local area network (WLAN) I/F 116 (e.g., an appropriate wireless modem including a wireless transceiver that includes a wireless receiver and transmitter)) to receive and transmit data through WLANs. In one particular embodiment, I/F 116 may communicate through a WLAN with owner AP 130 and owner device 160, as will be hereinafter described.

Guest wireless device 110 may also include sensors 117, including proximity sensors, motion sensors, accelerometer sensors, position sensors, location sensors, pressure sensors, microphones, cameras, sounds sensors, light sensors, etc.

It should be appreciated that guest wireless device 110 may be any type of computing device that has wireless capabilities, such as: smart-phones, cell phones, tablets, personal digital assistants, personal computers, desktop computers, laptop computers, mobile computers, mobile devices, wireless phones, machine-to-machine (M2M) devices, or any type of computing device that includes wireless capabilities.

Further, as particularly shown in FIG. 2, owner AP 130 may include a processor 132 to implement an access control manager application 133, to implement operations to be hereinafter described, as well as a memory 134 to store virtual keys 136 and access control rules 138 received from the owner device 160. Owner AP 130 may also include a wireless I/F 131 to wirelessly communicate with guest wireless device 110 and owner device 160. Owner AP 130 may be a Wi-Fi type of WLAN device or any sort of WLAN device, access point, etc.

Similarly, owner device 160 may include a processor 162 to implement a virtual key issuer application 163, as will be hereinafter described, as well as a memory 164 to store virtual keys 166 and access control rules 168. Further, owner device 160 may include wireless I/F 161 in order to communicate with owner AP 130 and guest wireless device 110. It should be appreciated that owner device 160 may be any type of computing device that has wireless capability (e.g., a smart-phone, a tablet, a laptop computer, a personal computer, etc.). It should be appreciated that the term owner device or owner computing device is not restrictive as to the type of device that performs these functions. For example, the virtual key issuer of the owner device may be running on a web server that is accessed by the owner via an application or browser on the owner device. In the same way, wireless device 110 and owner AP 130 may be any sort of computing device having wireless capacity. However, it should be appreciated that in some embodiments, the communication of virtual keys and access control rules do not have to be wireless, but may be implemented via wired or via direction connections.

Looking at a particular implementation, in one embodiment, owner AP 130, under the control of access control manager application 133, may store a virtual key 136 and an access control rule 138 associated with the virtual key 136 for a particular guest wireless device. The virtual key 136 and the associated access control rule 138 may be defined and issued by the virtual key issuer 160 and wirelessly transmitted via link 139 to the owner AP 130. Similarly, the issued virtual key 136 may be wirelessly transmitted via a link 169 to the guest's wireless device 169. This may be done locally via a WLAN link (or via a direct wired link—not wirelessly), or not locally via a cellular link.

When a guest 102 having a guest wireless device 110 under the control of a virtual key container application 113 comes into close proximity to owner AP 130, guest wireless device 110 becomes associated with owner AP and securely transmits a virtual key (or proof of knowledge of said virtual key) via wireless link 111 to owner AP 130. Owner AP 130, under the control of access control manager application 133, determines whether the virtual key received from the guest wireless device 110 matches a virtual key 136 stored for the wireless device and whether the access control rule 138 associated with the stored virtual key is satisfied (e.g., correct day and time), and if so, owner AP 130 transmits an open command via link 142 to the entry 120 such that the lock 122 is unlocked and the guest may enter building 124.

The virtual key issuer application 163 of owner device 160 may issue virtual keys 136, and define access control rules 138 to be associated with the virtual keys 136, for particular guest wireless devices, such that guests with wireless devices having the appropriate virtual key, and satisfying the associated access control rule (e.g., correct day and time), may be granted access by having the entry 120 opened by the owner AP 130. As an example, an owner utilizing owner device 160, operating the virtual key issuer application 163, may define and issue a virtual key 136 for a particular guest wireless device and may transmit the virtual key 136 via wireless link 169 to the particular guest wireless device 110 where it may stored in memory 114. Additionally, the access control rule 138 defined for the virtual key 136 for that guest wireless device, in conjunction with the virtual key 136, may be transmitted via wireless link 139 to owner AP 130 where they may be stored in memory 134.

In this way, when a guest 102 with a guest wireless device 110 comes within adequate proximity to the owner AP 130, such that the guest wireless device 110 transmits the virtual key 115 via link 111 to the owner AP 130, the owner AP 130 determines whether the virtual key received from the guest wireless device 110 matches a virtual key 136 stored for that wireless device 110 and whether the associated access control rule 138 (e.g., correct day and time) stored for that virtual key is satisfied. If these requirements are met, the owner AP 130 may transmit via link 142 an open command such that the entry 120 is opened for the guest by unlocking the lock 122. However, it should be appreciated that the virtual key 115 is not necessarily transmitted from the guest wireless device 110 to the owner AP 130. Transmission of the virtual key may be dependent upon whether the link 111 is encrypted. For example, in one embodiment, if the link is not encrypted, the virtual key 115 may be used in a mutual authentication process, such as, a password-based authentication scheme or a secret key based authentication scheme (e.g., challenge response) as well as public key based authentication. The purpose of the virtual key is to authenticate the guest.

In one embodiment, virtual key 136 may include at least one of a wireless local area network (WLAN) credential and an authentication credential. As an example, the WLAN credential may include an identifier (e.g., an AP identifier) and the authentication credential may include a password. As an even more particular example, the WLAN credential may be a Wi-Fi credential (e.g., a guest service set identifier (SSID), MAC address, passphrase, etc.). Further, various access control rules 138 associated with the virtual key 136 may be defined by the owner of the owner device via the virtual key issuer application 163 of the owner device 160. Examples of these access control rules include: number of time usage (e.g., one time, ten times, one hundred times, etc.); a pre-set time period usage (e.g., one day, one week, one year, etc.); or pre-set days (Wednesdays and Thursdays) and pre-set times (e.g., 2-4 PM).

In one embodiment, the virtual key may be automatically wirelessly transmitted by the guest wireless device 110 to the owner AP 130, when the wireless device comes within a range of the owner AP 130, without requiring guest user input. As an example, virtual key container application 113 may trigger the authentication process by transmitting the virtual key via link 111 when the SSID listed in one of the virtual keys 136 is detected by the guest wireless device 110. Also, after the owner AP 130, under the control of the access control manager application 133, authorizes the guest wireless device 110 and transmits the open command via link 142 to open the entry 120, the owner AP 130 may also enable other functions such as disabling the security system 170, as well as enabling other systems 172 (e.g., lights, heating, etc.). It should be appreciated that based on the usage of an existing wireless device 110 (e.g., a smart-phone or tablet) that remains in the guest's 102 pocket or purse, entry/door 120 may be unlocked upon detection and authentication of guest 102 without any user interaction (e.g., there is no need to type in a PIN code on a keypad, swipe a card, etc.)

Figure 3:
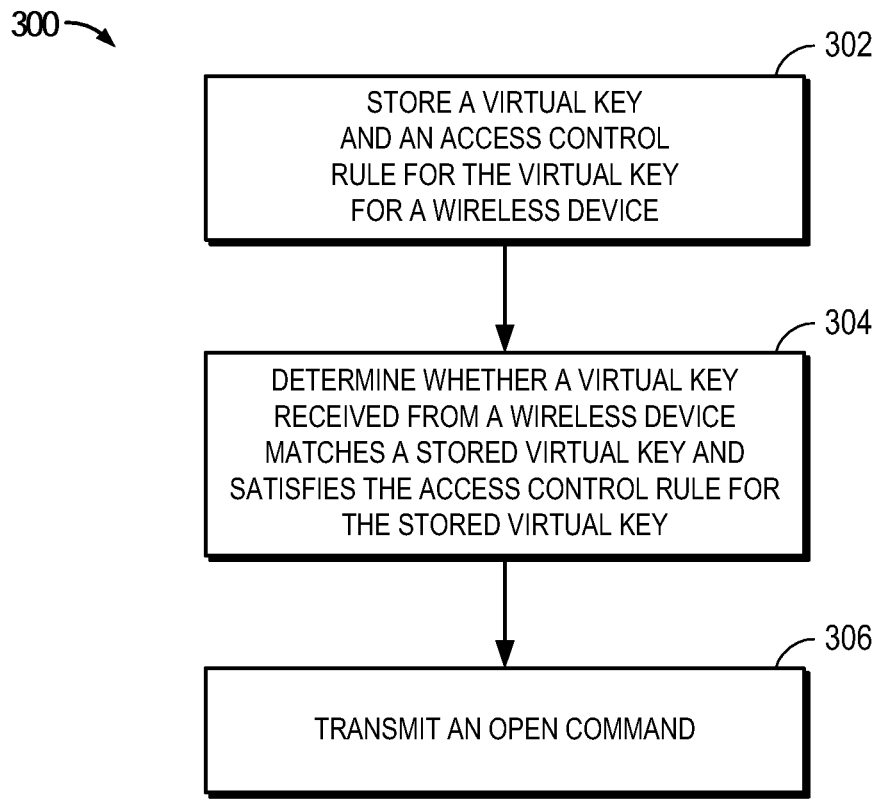
FIG. 3 is a flow diagram illustrating an example of a process implemented by an owner AP.

With brief reference to FIG. 3, a process 300 implemented by owner AP 130 under the control of access control manager application 133, according to one embodiment of the invention, will be hereinafter described. At block 302, a virtual key 136 and an access control rule 138 associated with the virtual key for a particular guest wireless device is stored at the owner AP 130. As previously described, owner device 160, under the control of virtual key issuer application 163, may define virtual keys 136 and associated access control rules 138 defined by the owner for particular guest wireless devices 110 and may transmit these virtual keys 136 and access control rules 138 for utilization by owner AP 130. Further, at block 304, owner AP 130 determines whether a virtual key received from a guest wireless device 110 matches a stored virtual key 136 for the guest wireless device and satisfies the access control rule 138 stored for the virtual key. If so, at block 306, owner AP 130 transmits an open command via link 142 to unlock lock 122 such that the entry 120 may be opened by a guest 102.

Figure 2:
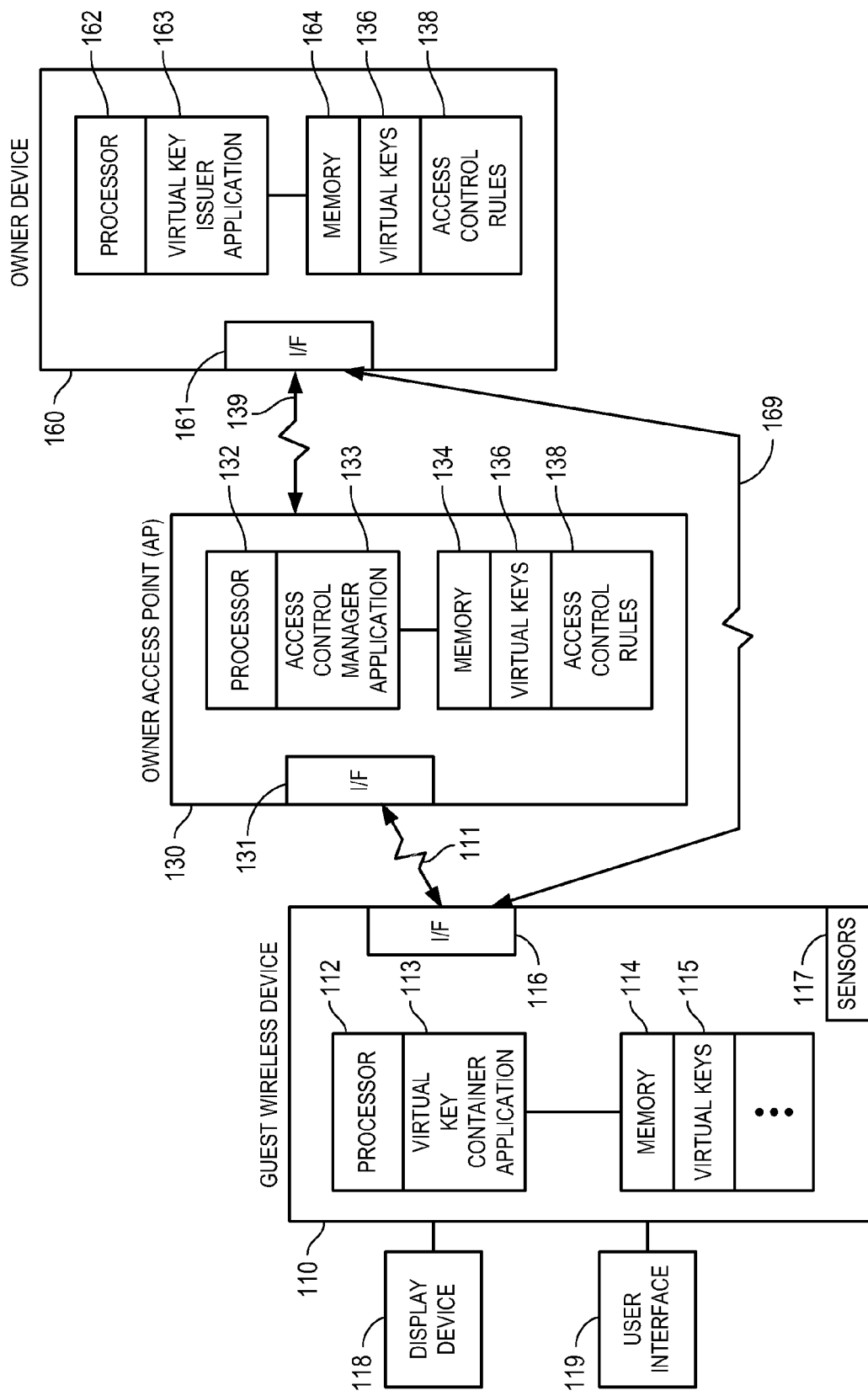
FIG. 2 is a diagram illustrating components of the embodiments of the invention.

In one particular example, with reference to FIGS. 1-2, the owner device 160 under control of processor 162 may run a virtual key issuer application 163 that may define and issue a virtual key 136 for a particular guest's wireless device 110 in which the virtual key may include any type of WLAN credential, such as a Wi-Fi credential (e.g., a guest service set identifier (SSID), MAC address, passphrase, etc.), and an authentication credential (e.g., a password). The virtual key may be wirelessly transmitted via link 169 to the guest's wireless device 110 (e.g., an employee's smart-phone, a housekeeper's smart-phone, a repair worker's smart-phone, etc.). Further, owner device 160 may transmit the virtual key 136, as well as pre-defined access control rules 138, via link 139 to the owner AP 130. In one embodiment, the access control rules 138 may be appended to the virtual key 136 and may include such rules as to when or how often the virtual key can be used, such as: virtual key can be used one time; virtual key can used every Wednesday from 2 pm to 4 pm; etc.

In one embodiment, a guest's wireless device 110, under control of processor 112, may implement a virtual key container application 113 that triggers the authentication process with the owner AP 130 by transmission of the virtual key 136 via link 111 when the identifier of the owner AP 130 (e.g., a SSID), which is listed in one of the virtual keys 136 stored by the guest's wireless device, is detected by the guest's wireless device. Further, the owner AP 130 implementing the access control manager application 133 may perform authentication of the guest's wireless device 110, based on the received virtual key, by ensuring that it matches a stored virtual key 136 and that the access control rule 138 for the stored virtual key is satisfied and therefore enforced. Thereafter, access control manager application 131 may transmit an open command that is transmitted via wireless link 142 to unlock the lock 122 such that the entry/door 120 may be opened.

Figure 4:
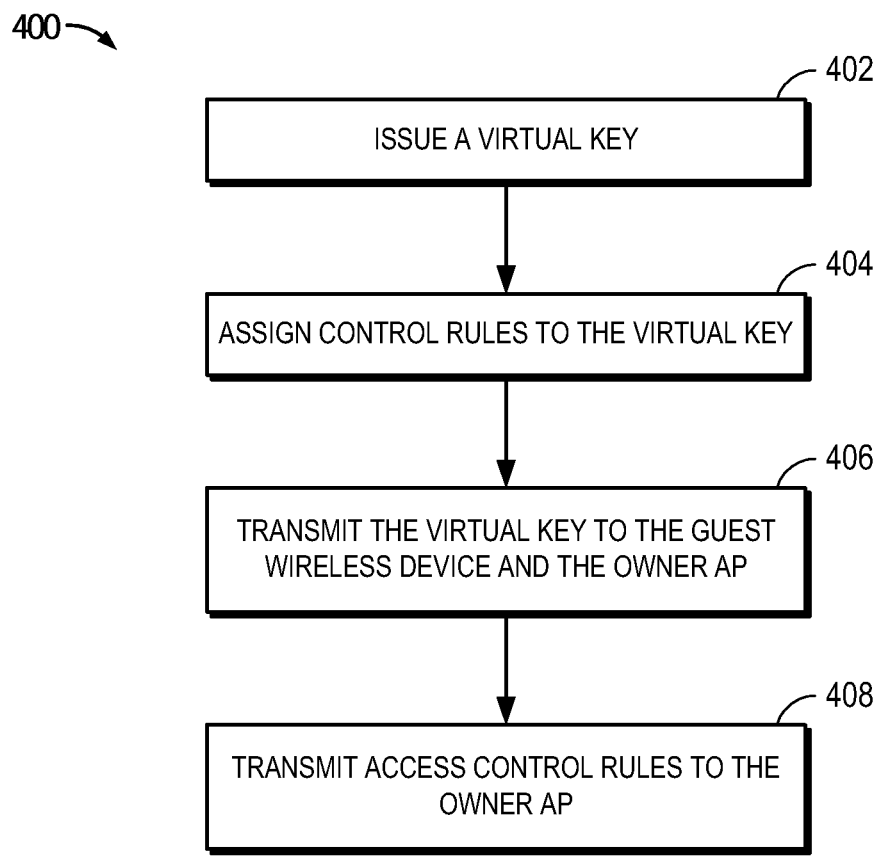
FIG. 4 is a flow diagram illustrating an example of a process implemented by an owner device.

Referring briefly to FIG. 4, a flow diagram illustrating a process 400 that may be implemented by the virtual key issuer application 163 of owner device 160, according to one embodiment, will be hereinafter described. At block 402, owner device 160 creates and issues a virtual key for a particular guest's wireless device 110. At block 404, owner device 160 assigns access control rules to the virtual key. At block 406, owner device 160 transmits the virtual key 136 to the guest wireless device 110 and the owner AP 130. Further, at block 408, owner device 160 transmits access control rules 138 associated with the virtual key, as defined by the owner, to owner AP 130. It should be appreciated that beneficially the owner device 160 may be any type of common computing device (e.g., a smart-phone, a tablet, a laptop, etc.) for ease of use by an owner.

Figure 5:
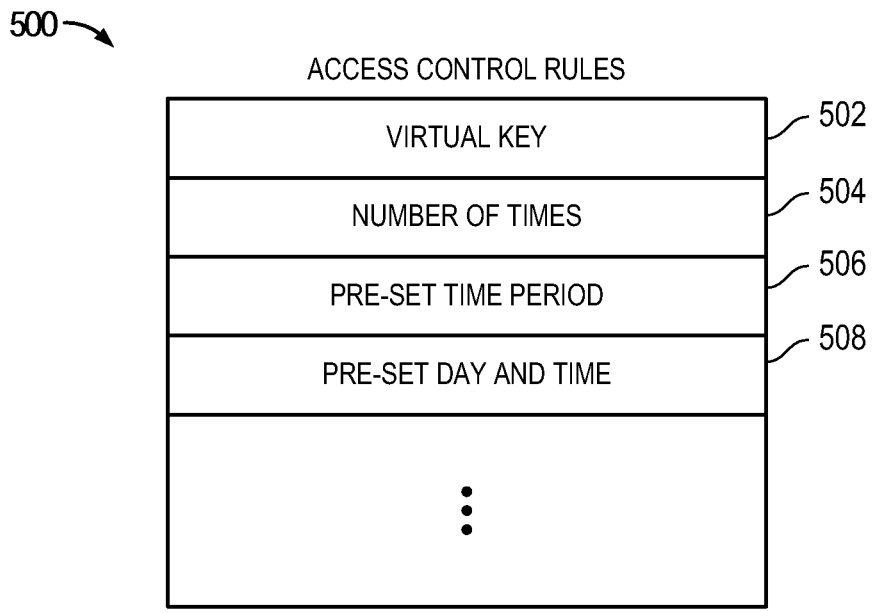
FIG. 5 is a table illustrating example types of access control rules.

As to particular examples of access control rules, with brief reference to FIG. 5, a table 500 illustrating types of access control rules, according to one embodiment, will be hereinafter described. As shown in table 500, for a particular virtual key 502, a number of different types of access control rules may be defined by a user such as: number of times usage 504 (e.g., one time, ten times, one hundred times, etc.); pre-set time period usage 506 (e.g., one day, one week, one month, one year, etc.); or pre-set day and time usage 508 (e.g. Wednesdays and Thursdays at 2-4 pm, only). It should be appreciated that these are just examples of access control rules and that a wide variety of different types of access control rules may be defined by the owner of the owner device 160 and may be implemented via the virtual key issuer application 163.

Providing a particular example illustration, with reference again to FIGS. 1 and 2, a home owner of house 124 may utilize their owner device 160 to provide predefined access rights to their house 124 through a door 120 to a guest according to access control rules that are defined by the owner for the guest 102 (e.g., a housekeeper). This may be accomplished, as previously described, by utilizing the virtual key issuer application 163 of the owner device 160, which transmits an issued virtual key 136 that the owner assigned to the guest 102, as well as, access control rules 138 with predefined characteristics for the guest to the owner AP 130. Further, the assigned virtual key 136 is also transmitted to the guest's wireless device 110.

Based upon this, when the housekeeper's wireless device 110 comes into range of the owner's AP 130, an AP protocol is executed that, if successful, causes the owner AP 130 to check the virtual key 136 and the access control rules 138, and if the virtual key matches and the access control rules 138 are satisfied, owner AP 130 transmits an open command via link 142 to lock 122 such that it is unlocked. The door 120 may then be opened by the housekeeper 102 such that the housekeeper can perform their job functions. It should be appreciated that this is just one of many different types of examples that may be utilized with aspects of the invention. Further, the owner may also define rules as to the conditions that the door 120 remains open and/or unlocked. For example, the door may remain open and/or unlocked for a pre-set period of time (e.g., 10 minutes after the guest arrives and the door is opened) or until a certain condition is met (e.g., the guest leaves the home network). It should be appreciated that a wide variety of different types of functions may be implemented by the owner.

As an even more particular example, it should be appreciated that aspects of the invention may be implemented based on the usage of an existing wireless device 110 (e.g., a smart-phone) and existing Wi-Fi infrastructures (e.g., a Wi-Fi router 130), such that a door 120 may be unlocked upon detection and authentication of the guest 102 without any user interaction, (e.g., typing in a PIN code on a keypad). As an example, the wireless device 110 (e.g., a smart-phone or tablet) may remain in the guest's 102 pocket or purse and the door may be automatically opened after authentication. The system owner through utilization of the owner computing device 160 may provide a virtual key 136 to any third party based on the virtual key issuer application 163 on their owner computing device 160 (e.g., a smart-phone, laptop, tablet, etc.). Similarly, the guest's wireless device 110 (e.g., a smart-phone) of the third party (e.g., a guest) becomes a virtual key container via a virtual key container application 113 that contains appropriate virtual keys 136. In particular, the virtual key 136 may include such items as: Wi-Fi credentials (e.g., SSID, MAC address, passphrase, etc.) and additional authentication credentials (e.g., a password, etc.). As previously described, the virtual key authentication credential (e.g., virtual key) may be submitted by the guest wireless device 110 to the owner AP gateway 130 for verification once the guest wireless device 110 is connected to the guest Wi-Fi network.

Further, as previously described, the virtual key 136 may be associated with access control rules 138 to limit its usage (e.g., to certain dates/time slots, number of uses, etc.). In this way, the owner AP 130 can automatically unlock the door 120 and/or other systems based on authentication success/failure. The door 120 and other systems may be connected to the owner AP 130 by various means (e.g., wired, Wi-Fi, cellular etc.).

It should be appreciated that aspects of the invention may be related to a wide variety of different implementations and those previously described are just examples. For example, structure 124 may be a building, a house, an apartment, a government building or facility, a university building or facility, a corporate building or facility, or any sort of room, building, structure, etc., that has an entry. Moreover, entrance 120 may be a typical door, a specialized door, a garage door, or any sort of opening/closing entry (interior opening, exterior opening, slideable opening, etc.) that has a lock 122. Further, it should be appreciated that lock 122 may be any sort of locking mechanism that allows for the opening and closing of an entry way that may receive an open or close command 142. Moreover, although many of the links such as links 111, 139, 142, 169, etc. have been described as wireless links, in many implementations these may be wired links. Accordingly, it should be appreciated that aspects of the invention may be related to a wide variety of different mobile wireless devices 110, access points 130, and owner computing devices 160 that may implement embodiments of the invention related to the use of virtual keys and access control rules to allow for the assignment and utilization of virtual keys by guests with very specific, pre-defined access control rules by an owner.

Further, embodiments of the invention may implement an anti-relay attack function to prevent potential relay attacks. As an example, a relay attack may consist of a hacker and his partner approaching a guest having a guest wireless device with a virtual key and activating a spoofing AP with the same identity (SSID) as the owner's AP. Based upon this, the guest wireless device may transmit its virtual key to the spoofing AP. The virtual key may then be relayed by hacker 1 (near guest) to hacker 2 (near the owner house/AP). Thereafter, hacker 2 utilizing the hacker 2 device may emulate the guest by providing the virtual key to the owner AP. This type of relay attack (e.g., 2 men in the middle) may be addressed by implementing an anti-relay attack function. In one embodiment, guest wireless device 110 may utilize its GPS feature to transmit a cryptographically protected GPS location of the wireless device along with the virtual key such that the owner AP 130 may decode the cryptographically protected GPS location information to authenticate the guest wireless device 110. The owner AP 130 is typically at a fixed location and can check that the guest wireless device's 110 location is within a certain radius of the predefined location. In another embodiment, the owner AP 130 may authenticate itself to the guest wireless device 110. This may be implemented by Wi-Fi based security, e.g., Wi-Fi Protected Access (WPA).

It should be appreciated that aspects of the invention previously described may be implemented in conjunction with the execution of instructions (e.g., applications) by processors of the devices (e.g., wireless device 110, owner AP 130, owner device 160), as previously described. Particularly, circuitry of the devices, including but not limited to processors, may operate under the control of an application, program, routine, or the execution of instructions to execute methods or processes in accordance with embodiments of the invention (e.g., processes 300 and 400 of FIGS. 3 and 4). For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network (e.g., WLAN) or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). Additionally, newer standards include 4G and Advanced LTE.

The teachings herein may be incorporated into (e.g., implemented within or performed by) a variety of apparatuses (e.g., devices). For example, one or more aspects taught herein may be incorporated into a smart-phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to control unlocking an entry for a guest having a wireless device by a wireless local area network (WLAN) access point receiving information from an owner management device comprising:
    storing a first virtual key for the wireless device and an access control rule associated with the first virtual key for the wireless device in a memory of the WLAN access point, the first virtual key for the wireless device and the access control rule for the wireless device being received from the owner management device through a local wireless interface of the WLAN access point, the first virtual key being assigned particularly for the wireless device and not the entry;
    determining whether a second virtual key received from the wireless device that is stored at the wireless device that is received through the local wireless interface of the WLAN access point matches the stored first virtual key for the wireless device stored in the memory of the WLAN access point and satisfies the access control rule for the stored first virtual key for the wireless device stored in the memory of the WLAN access point, and, if so,
    transmitting an open command to the entry from the WLAN access point wirelessly through a wireless link to the entry to command the opening of the entry, the WLAN access point being separate from and located at a different location than the entry, wherein the second virtual key from the wireless device includes a WLAN credential and an authentication credential and the WLAN credential includes an identifier associated with the WLAN access point and the authentication credential includes a password for the wireless device and the second virtual key does not include access control rules.

2. The method of claim 1 wherein, the access control rule for the first virtual key includes a number of times usage.

3. The method of claim 1 wherein, the access control rule for the first virtual key includes a pre-set time period usage.

4. The method of claim 1 wherein, the access control rule for the first virtual key includes a pre-set day and time usage.

5. The method of claim 1 wherein, the second virtual key is transmitted by the wireless device to the WLAN access point, when the wireless device comes within a range of the WLAN access point, without requiring guest user input.

6. The method of claim 1 wherein, the second virtual key is only transmitted from the wireless device to the WLAN access point if a link between the wireless device and the WLAN access point is encrypted.

7. The method of claim 1 further comprising implementing an anti-relay attack function.

8. The method of claim 1 wherein, the second virtual key is used to perform a mutual authentication with the WLAN access point if a link between the wireless device and the WLAN access point is not encrypted.

9. The method of claim 1 wherein, the owner management device assigns and transmits the first virtual key and the access control rule for the first virtual key.

10. The method of claim 1 further comprising, disabling a security system after transmitting the open command to the entry.

11. A wireless local area network (WLAN) access point receiving information from an owner management device, the WLAN access point comprising:
    a memory;
    a local wireless interface; and
    a processor coupled to the memory and the local wireless interface to execute operations including:
        storing a first virtual key for a wireless device and an access control rule associated with the first virtual key for the wireless device in the memory, the first virtual key for the wireless device and the access control rule for the wireless device being received through the local wireless interface from the owner management device, the first virtual key being assigned particularly for the wireless device and not an entry;
        determining whether a second virtual key received from the wireless device that is stored at the wireless device that is received through the local wireless interface matches the stored first virtual key for the wireless device stored in the memory of the WLAN access point and satisfies the access control rule for the stored first virtual key for the wireless device stored in the memory of the WLAN access point, and, if so,
        transmitting an open command to the entry from the WLAN access point wirelessly through a wireless link to the entry to command the opening of the entry, the WLAN access point being separate from and located at a different location than the entry, wherein the second virtual key from the wireless device includes a WLAN credential and an authentication credential and the WLAN credential includes an identifier associated with the WLAN access point and the authentication credential includes a password for the wireless device and the second virtual key does not include access control rules.

12. The WLAN access point of claim 11 wherein, the access control rule for the first virtual key includes a number of times usage.

13. The WLAN access point of claim 11 wherein, the access control rule for the first virtual key includes a pre-set time period usage.

14. The WLAN access point of claim 11 wherein, the access control rule for the first virtual key includes a pre-set day and time usage.

15. The WLAN access point of claim 11 wherein, the second virtual key is transmitted by the wireless device to the WLAN access point, when the wireless device comes within a range of the WLAN access point, without requiring guest user input.

16. The WLAN access point of claim 11 wherein, the second virtual key is only transmitted from the wireless device to the WLAN access point if a link between the wireless device and the WLAN access point is encrypted.

17. The WLAN access point of claim 11, further comprising implementing an anti-relay attack function.

18. The WLAN access point of claim 11 wherein, the second virtual key is used to perform a mutual authentication with the WLAN access point if a link between the wireless device and the WLAN access point is not encrypted.

19. The WLAN access point of claim 11 wherein, the owner management device assigns and transmits the first virtual key and the access control rule for the first virtual key.

20. The WLAN access point of claim 11 further comprising disabling a security system after transmitting the open command to the entry.

21. A wireless local area network (WLAN) access point receiving information from an owner management device comprising:
    means for storing a first virtual key for the wireless device and an access control rule associated with the first virtual key for the wireless device at the WLAN access point, the first virtual key for the wireless device and the access control rule for the wireless device being received through a local wireless interface from the owner management device, the first virtual key being assigned particularly for the wireless device and not an entry;
    means for determining whether a second virtual key received from the wireless device that is stored at the wireless device that is received through the local wireless interface matches the stored first virtual key for the wireless device stored at the WLAN access point and satisfies the access control rule for the stored first virtual key for the wireless device stored at the WLAN access point, and, if so,
    means for transmitting an open command to the entry from the WLAN access point wirelessly through a wireless link to the entry to command the opening of the entry, the WLAN access point being separate from and located at a different location than the entry, wherein the second virtual key from the wireless device includes a WLAN credential and an authentication credential and the WLAN credential includes an identifier associated with the WLAN access point and the authentication credential includes a password for the wireless device and the second virtual key does not include access control rules.

22. The WLAN access point of claim 21 wherein, the access control rule for the first virtual key includes a pre-set time period usage.

23. The WLAN access point of claim 21 wherein, the access control rule for the first virtual key includes a pre-set day and time usage.

24. The WLAN access point of claim 21 wherein, the second virtual key is transmitted by the wireless device to the WLAN access point, when the wireless device comes within a range of the WLAN access point, without requiring guest user input.

25. The WLAN access point of claim 21 wherein, the owner management device assigns and transmits the first virtual key and the access control rule for the first virtual key.

26. The WLAN access point of claim 21 wherein, the second virtual key is used to perform a mutual authentication with the WLAN access point if a link between the wireless device and the WLAN access point is not encrypted.

27. A non-transitory computer-readable medium including code that, when executed by a wireless local area network (WLAN) access point receiving information from an owner management device, causes the WLAN access point to:
    store a first virtual key for a wireless device and an access control rule associated with the first virtual key for the wireless device in a memory of the WLAN access point, the first virtual key for the wireless device and the access control rule for the wireless device being received from the owner management device through a local wireless interface of the WLAN access point, the first virtual key being assigned particularly for the wireless device and not an entry;
    determine whether a second virtual key received from the wireless device that is stored at the wireless device that is received through the local wireless interface of the WLAN access point matches the stored first virtual key for the wireless device stored in the memory of the WLAN access point and satisfies the access control rule for the stored first virtual key for the wireless device stored in the memory of the WLAN access point, and, if so,
    transmit an open command to the entry from the WLAN access point wirelessly through a wireless link to the entry to command the opening of the entry, the WLAN access point being separate from and located at a different location than the entry, wherein the second virtual key from the wireless device includes a WLAN credential and an authentication credential and the WLAN credential includes an identifier associated with the WLAN access point and the authentication credential includes a password for the wireless device and the second virtual key does not include access control rules.

28. The computer-readable medium of claim 27 wherein, the access control rule for the first virtual key includes a number of times usage.

29. The computer-readable medium of claim 27 wherein, the access control rule for the first virtual key includes a pre-set time period usage.

30. The computer-readable medium of claim 27 wherein, the access control rule for the first virtual key includes a pre-set day and time usage.

31. The computer-readable medium of claim 27 wherein, the second virtual key is transmitted by the wireless device to the WLAN access point, when the wireless device comes within a range of the WLAN access point, without requiring guest user input.

32. The computer-readable medium of claim 27 wherein, the owner management device assigns and transmits the first virtual key and the access control rule for the first virtual key.

33. The computer-readable medium of claim 27 wherein, the second virtual key is used to perform a mutual authentication with the WLAN access point if a link between the wireless device and the WLAN access point is not encrypted.

* * * * *